United States Patent
Antikidis (10) Patent No.: US 8,384,778 B2
(45) Date of Patent: Feb. 26, 2013

(54) INSTRUMENT FOR ACQUISITION AND DISTRIBUTION OF TERRESTRIAL OBSERVATION IMAGES WITH HIGH SPATIAL AND TEMPORAL RESOLUTION

(75) Inventor: Jean-Pierre Antikidis, Castanet (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 342 days.

(21) Appl. No.: 12/675,859

(22) PCT Filed: Aug. 28, 2008

(86) PCT No.: PCT/FR2008/001210
§ 371 (c)(1),
(2), (4) Date: Mar. 1, 2010

(87) PCT Pub. No.: WO2009/060139
PCT Pub. Date: May 14, 2009

(65) Prior Publication Data
US 2010/0309313 A1 Dec. 9, 2010

(30) Foreign Application Priority Data
Aug. 31, 2007 (FR) ..................................... 07 06117

(51) Int. Cl.
*H04N 7/18* (2006.01)
*H04N 5/76* (2006.01)
*G03B 39/00* (2006.01)

(52) U.S. Cl. ..... 348/144; 348/113; 348/148; 348/231.5; 396/7

(58) Field of Classification Search ................ 348/113, 348/144, 148, 419, 231.5, 231.3, E5.0204; 382/294, 284, 113; 396/7
See application file for complete search history.

(56) References Cited

U.S. PATENT DOCUMENTS

| | | | | |
|---|---|---|---|---|
| 4,912,475 A | * | 3/1990 | Counselman, III | 342/352 |
| 5,561,837 A | * | 10/1996 | Muller et al. | 455/13.1 |
| 5,899,957 A | * | 5/1999 | Loomis | 701/470 |

(Continued)

FOREIGN PATENT DOCUMENTS

| | | |
|---|---|---|
| EP | 0 992 764 | 4/2000 |
| EP | 1 106 964 | 6/2001 |

(Continued)

OTHER PUBLICATIONS

International Search Report dated May 4, 2009, from corresponding PCT application.

*Primary Examiner* — Joseph Avellino
*Assistant Examiner* — Aftab Nasir Khan
(74) *Attorney, Agent, or Firm* — Young & Thompson (57) ABSTRACT

An instrument for of observation images exhibits a high ground resolution and a high frequency of coverage of the Earth. Such an instrument includes a spatial images acquisition layer (1) including satellites (4), a terrestrial images processing layer (3), including images processing devices (5), and a telecommunications layer (2) that is suitable to ensure a transfer of the images from the spatial layer (1) to the terrestrial layer (3), wherein each satellite (4) includes at least one images acquisition device with fixed aim exhibiting a spatial resolution of the order of one meter; each images processing device (5) includes at least one communications line (8) coupling the images processing device (5) and at least one immediately adjacent images processing device, a processing unit that is suitable to process the images received, element for storage of the processed images, and a connection to a digital network.

17 Claims, 5 Drawing Sheets

U.S. PATENT DOCUMENTS

| | | | | |
|---|---|---|---|---|
| 2003/0095181 A1* | 5/2003 | LeCompte | | 348/144 |
| 2003/0221010 A1* | 11/2003 | Yoneya et al. | | 709/227 |
| 2007/0130604 A1* | 6/2007 | Han et al. | | 725/131 |
| 2008/0189368 A1* | 8/2008 | Rothschild | | 709/205 |
| 2008/0192710 A1* | 8/2008 | Balachandran et al. | | 370/338 |

FOREIGN PATENT DOCUMENTS

| | | |
|---|---|---|
| FR | 2 893 794 | 5/2007 |
| GB | 2 432 486 | 5/2007 |
| JP | 2001-285170 | 10/2001 |

* cited by examiner

INSTRUMENT FOR ACQUISITION AND DISTRIBUTION OF TERRESTRIAL OBSERVATION IMAGES WITH HIGH SPATIAL AND TEMPORAL RESOLUTION

The invention relates to an instrument for acquisition and provision of terrestrial-observation satellite images exhibiting a high ground resolution (10 meters or less, in particular of the order of one meter) and a high frequency of global coverage of the Earth (two weeks or less, in particular of the order of one day).

Throughout the text, the expression "frequency of global coverage of the Earth" designates the frequency with which an instrument permits a complete shot of the Earth.

The observation of the Earth by instruments placed in satellite orbit originated in the 1950s with the development of instruments dedicated, in particular, to meteorology. Such instruments have not ceased to be developed ever since, favouring alternatively, according to the intended applications, the ground resolution or the refresh frequency.

Nowadays there are a large number of instruments for terrestrial observation, including Landsat, MODIS, IKONOS, QuickBird, EROS, SPOT 5, SPOT 4, etc. These instruments make it possible to satisfy numerous needs for imagery in fields as varied as agriculture, cartography, cadastral surveying, defence, the environment, urban planning, telecommunications, risk management, management of renewable resources, etc.

The instruments IKONOS, QuickBird, EROS, etc. are satellites with very high resolutions which permit ground resolutions of the order of one meter. On the other hand, they exhibit refresh-rates of the whole of the globe that are higher than one month.

The instruments MODIS, MERIS, etc. are instruments that exhibit low resolutions but high refresh-rates of the whole of the globe, of the order of three days to one week.

In other words, in the view of the state of the art the design of an instrument for acquisition and provision of terrestrial-observation satellite images is subject to contradictory constraints. Thus there is a choice between an instrument with high spatial resolution—of the order of one meter—but with a low frequency of global coverage—of the order of one week or one month—and an instrument with high frequency of global coverage—of the order of one day—but with low spatial resolution—of the order of 100 meters.

Alternative solutions have been proposed in order to be able to benefit from a high frequency of coverage of predetermined specific zones while benefiting from a favourable spatial resolution. They consist in having recourse to one or more satellites equipped with optical instruments for acquisition of images, suitable to enable a depointing of these instruments. Indeed, the fact of being able to acquire images outside the natural track of a satellite enables observation of the same geographical zone in the course of several successive rotations of the satellite.

For example, the constellation of SPOT satellites offers an acquisition capacity and a refresh-rate making it possible to acquire an image of a predetermined zone of the globe each day. Said constellation comprises a plurality of satellites placed in a polar, circular, heliosynchronous orbit and in phase in relation to the Earth. Each satellite exhibits a cycle of 26 days. Each satellite includes optical instruments, data recorders and systems for transmission of the images to receiving stations on the ground. The optical instruments are suitable to ensure parameterisable oblique aims, so that the same region can be observed several times in the course of the cycle of 26 days. The data recorders make it possible to store the images on board if the satellite is not in the line of sight of a ground station.

Said constellation can thus exhibit a high frequency of coverage of a specific zone of the Earth. Nevertheless, the frequency of global coverage may not be less than 26 days. Moreover, if the constellation is programmed so that numerous depointing operations are effected in the course of the cycle of 26 days the frequency of global coverage of the Earth can be considerably more than 26 days.

Another disadvantage of such a solution lies in the cost of manufacture, installation, management and maintenance of a constellation of satellites with depointing. In particular, such a constellation requires the installation and management on the ground of a plurality of ground stations operated autonomously in relation to one another and suitable to send the received image data to a central server for backup of the images with a view to their distribution. Furthermore, each instrument of each satellite is controlled from the ground by a team of specialists charged with determining and optimising the operations for depointing of the optical instruments as required. Furthermore, each satellite has to include recorders, in order to make up for an absence of visibility from a ground station. Each satellite includes, in addition, a specific system for transmission to the ground.

Moreover, such a solution encounters a major practical difficulty. Indeed, the coverage of the whole of the terrestrial globe by such a constellation of satellites with a view to providing images exhibiting a spatial resolution of the order of one meter and a frequency of global coverage of the order of one day necessitates management by the central server of the order of 1500 terabytes of data per day, that is to say 17 gigabytes per second, considerably exceeding the capacities for satellite transmission and ground processing that are attainable with the technologies and architectures of the servers currently available.

The invention aims to overcome these disadvantages, to surmount these difficulties and to propose an instrument for acquisition and provision of observation images of the Earth that exhibits a high spatial resolution and a high temporal resolution, in particular of the order of one meter and one day, respectively.

The invention also aims to propose such an instrument that does not resort to any depointing of optical instruments, thus enabling a use of simplified satellites of low cost and capable of functioning without complex operations.

The invention also aims to propose such an instrument that does not require a central server for distribution of the images.

The invention also aims to propose such an instrument that does not require specific maintenance.

The invention also aims to propose such an instrument that is suitable to feed the mass-information vehicles available on the Internet network.

In this view, the invention relates to an instrument for acquisition and distribution of observation images of the Earth of mean circumference C comprising:

- a constellation of satellites, called the spatial images acquisition layer, each satellite exhibiting a swath F and a low orbit so that it can describe a number ORB (ORB>1) of orbits in a day, and being equipped with at least one optical images acquisition device,
- a plurality of terrestrial devices for processing and distribution of images, called the terrestrial layer for processing and distribution of images,
- a data-transmission network, called the telecommunications layer, that is suitable to ensure a transfer of the images captured by the spatial images acquisition layer to said terrestrial layer for processing and distribution of images, said telecommunications layer comprising:

for each satellite, at least one sending module that is suitable to send, after each acquisition of images by said at least one optical images acquisition device pertaining to said satellite, the acquired image to said terrestrial layer for processing and distribution of images, for each terrestrial images processing and distribution device, at least one receiving module that is suitable to receive images resulting from said spatial images acquisition layer, wherein:

said spatial images acquisition layer comprises, for each satellite, at least one optical images acquisition device having a fixed aiming and exhibiting a high spatial resolution, said terrestrial layer for processing and distribution of images comprises, for each terrestrial images processing and distribution device, at least one communications line coupling said terrestrial images processing and distribution device and at least one immediately adjacent terrestrial images processing and distribution device, so as to enable overlaps of the images received by said terrestrial images processing and distribution device with images received by said at least one immediately adjacent terrestrial images processing and distribution device(s), each terrestrial images processing and distribution device comprises:

a processing unit that is suitable to process the images received by the receiving module of said terrestrial images processing and distribution device, memory means receiving and storing said images processed by the processing unit, a connection to a digital network allowing to place said stored images at the disposal of users coupled to said digital network.

An instrument according to the invention includes a plurality of satellites, each satellite including a device with fixed aim and a module for sending each acquired image to the processing layer by means of the telecommunications layer. This sending is subsequent to each acquisition, so that a satellite of a spatial layer of an instrument according to the invention does not need to be equipped with data recorders on board. In particular, there is no longer any need to wait for the satellite to be in the line of sight of a ground station. If a receiving module is in the line of sight of the sending module, this latter receives the image and treats it. In the contrary case, the image is lost. In other words, each device for acquisition of images with fixed aim of a satellite of an instrument according to the invention carries out systematic shots followed by systematic transmissions to the ground. The devices for sending the images are not concerned with the destiny of the sent images—reception by a receiving module or failure of the reception. Whatever happens, the following image is acquired and in turn sent to the ground.

An instrument according to the invention makes it possible to circumvent the technological and economic limits of the solutions of the prior art through the implementation of three indissociable and nested technical layers on the scale of the planet: the spatial images acquisition layer, the telecommunications layer, and the terrestrial layer for processing and distribution of the images. Such an instrument ensures a delocalisation of the instrument, created on the scale of the Earth, enabling an apportionment of the acquisition loads over a plurality of satellites, an apportionment of the communications over the entirety of the modules for sending and receiving images, and an apportionment of the management and distribution of the images over devices for image processing which are interconnected with one another. This splitting of the functionalities of an instrument according to the invention makes it possible to dilute the flows of data while drastically simplifying the operation and management of the satellites.

An instrument according to the invention exhibits a high spatial resolution, each device for acquisition of images exhibiting a high spatial resolution. Throughout the text, the expression "high spatial resolution" designates a resolution less than 100 meters, in particular of the order of one meter.

Advantageously and according to the invention, each satellite of said spatial images acquisition layer includes at least one optical instrument for acquisition of images with fixed aim exhibiting a spatial resolution of the order of one meter. Advantageously and according to the invention:

each sending module of said telecommunications layer is suitable to communicate with at least one adjacent sending module, each receiving module of said telecommunications layer is suitable to communicate with at least one adjacent receiving module.

The constellation of satellites of an instrument according to the invention is suitable to cover the whole of the terrestrial globe or at least a major portion of the terrestrial globe.

Advantageously and according to the invention, said satellites of said spatial images acquisition layer, said terrestrial devices for processing and distribution of images pertaining to said terrestrial layer for processing and distribution of images, said modules for sending images pertaining to said telecommunications layer and said modules for receiving images pertaining to said telecommunications layer are geographically distributed over the whole of the Earth.

Advantageously and according to the invention, said spatial images acquisition layer comprises at least N satellites, where $$N = 2 * \frac{C}{ORB * F},$$

and said terrestrial layer for processing and distribution of images comprises at least M devices for processing of images distributed over the surface of the Earth, where $$M = \alpha \cdot \left(\frac{C}{\pi \cdot r}\right)^2,$$

r being the mean radius of the circles of visibility of the receiving modules linked with the terrestrial devices for processing and distribution of images, and α being a predetermined coefficient.

A satellite is thus constantly in the line of sight of at least one module for receiving images.

In particular, for a satellite that describes a number ORB of orbits in one day the distance measured at the equator between two transits is C/ORB. Thus if each satellite exhibits a swath F, the number of satellites necessary to cover the whole of the globe in one day is at least $$\frac{C}{ORB*F}.$$

In reality, at least $$N = 2 * \frac{C}{ORB*F}$$

are needed, because in the course of the ascending orbit of a satellite the Earth is not illuminated by the sun; only the descending orbit permits an acquisition of images.

According to a variant of the invention, the various satellites all exploit the same heliosynchronous quasi-polar orbit and are shifted in time, in order that their respective points of transit at the equator are separated by a quantity equal to the value of their swath F.

Thus an instrument according to the invention including a constellation of N satellites permits the shot each day of the entirety of the points of the globe, without necessitating any depointing of the optical instruments.

Each optical device of a satellite of an instrument according to the invention exhibits a high spatial resolution, advantageously of the order of one meter.

Thus an instrument for terrestrial observation according to the invention not only makes it possible to attain a high temporal resolution, of the order of one day, but also makes it possible to attain a high spatial resolution, of the order of one meter.

A number of satellites that is twice as great makes it possible to multiply the rate of revisit by two.

Each image is transmitted, as soon as it is acquired, to the terrestrial layer for processing and distribution of images by the telecommunications layer. According to a variant of the invention, said telecommunications layer is suitable to transmit each received image to the nearest terrestrial images processing and distribution device.

Each module for receiving images pertaining to said telecommunications layer advantageously includes a receiving antenna exhibiting a circle of visibility of radius r.

According to a variant of the invention, each terrestrial images processing and distribution device is linked with a dedicated receiving module close to said terrestrial images processing and distribution device. Nevertheless, there is nothing to prevent providing receiving modules that are remote from the terrestrial devices for processing and distribution of images.

The terrestrial layer for processing and distribution of images advantageously comprises M terrestrial devices for processing and distribution of images, where $$M = \alpha \cdot \left(\frac{C}{\pi \cdot r}\right)^2,$$

where $\alpha$ is a predetermined coefficient that determines the rate of overlap.

$\alpha$ is a coefficient that makes it possible to ensure an overlap of the various circles of visibility of the antennas linked with the receiving modules. In practice, $\alpha$ is between 1.1 and 1.25, enabling rates of overlap of the zones of visibility ranging between 10% and 25% to be obtained.

Thus, whatever its position, a satellite is in the line of sight of at least one antenna for receiving an image.

According to a variant of the invention, the telecommunications layer may also include other devices arranged between the spatial layer and the terrestrial layer for processing and distribution of images, such as relay antennas, or a constellation of intermediate satellites responsible for receiving the images originating from the spatial images acquisition layer and for retransmitting them to the ground to a images processing and distribution device.

According to the invention, each image is sent to a terrestrial images processing and distribution device pertaining to the terrestrial layer for processing and distribution of images. Said terrestrial images processing and distribution device is coupled to a digital network, so that a user coupled to said digital network can retrieve said image. Each terrestrial images processing and distribution device is coupled to the immediately adjacent terrestrial devices for processing and distribution of images, so that the overlaps of images can be brought about. Indeed, two adjacent terrestrial devices for processing and distribution of images receive images that are representative of neighbouring zones, given that each terrestrial images processing and distribution device can only receive images corresponding to its zone of visibility defined by its circle of visibility of radius r. Each terrestrial images processing and distribution device can create a local mosaic through the use of the telecommunications lines arranged between two adjacent terrestrial devices for processing and distribution of images.

The images captured by an instrument according to the invention are not centralised. They are constantly distributed over the totality of the terrestrial devices for processing and distribution of images.

An instrument according to the invention implements the integration of the images—i.e. the geometrical corrections, the possible photometric corrections, the changes of points of reference and changes of coordinates, the determinations of the boundaries of images and the overlaps—by means of the various terrestrial devices for processing and distribution of images which are distributed over the surface of the globe. In other words, a part of the instrument is delocalised on the ground, and said instrument part responsible for the integration of the images is distributed over the surface of the terrestrial globe. Also, the global terrestrial image created by an instrument according to the invention is constantly distributed over the whole of the globe. Each terrestrial images processing and distribution device includes a fraction of the global terrestrial image in its storage means.

Moreover, since each terrestrial images processing and distribution device is suitable to receive solely the images originating from the satellites that overfly it, the images received by a terrestrial images processing and distribution device cover a predetermined region.

Consequently, a user that wishes to access one or more images of a region of the terrestrial globe can determine which terrestrial images processing and distribution device it has to send its request to.

Throughout the text, the term "user" designates a machine or a machine/man combination that is suitable for establishing a communication with a processing device by means of the digital network.

The spatial images acquisition layer pertaining to an instrument according to the invention comprises a constellation of satellites comprising at least N satellites. The ideal number of satellites depends on the swath of each satellite.

Advantageously and according to the invention, the spatial images acquisition layer comprises at least N satellites, each satellite exhibiting a swath of the order of 2500/N kilometers.

According to a variant of the invention, the spatial images acquisition layer comprises at least 25 satellites, each satellite exhibiting a swath of the order of 100 kilometers.

According to another variant of the invention, the spatial images acquisition layer comprises at least 250 satellites, each satellite exhibiting a swath of the order of 10 kilometers.

Each satellite of the spatial images acquisition layer pertaining to an instrument according to the invention includes a module for sending the images acquired by an optical device with fixed aim that is suitable to send, after each acquisition of images, the image acquired by the telecommunications layer in such a way that it is transmitted to said terrestrial layer for processing and distribution of the images.

Said sending module may be of any known type.

Advantageously and according to the invention, for each satellite the module for sending the images pertaining to said telecommunications layer is suitable to ensure a compression of the images prior to their transfer to said terrestrial layer for processing and distribution of the images.

Said compression of the images may be implemented by any known type of means, for example by software means. It may be a question of a JPEG, MPEG, ZIP, RAR, etc. compression.

Advantageously and according to the invention, said compression effected by the module for sending the images is a JPEG compression.

The telecommunications layer is responsible for transmitting the compressed images to the terrestrial layer for processing and distribution of the images.

The transmissions of the images by said telecommunications layer from the spatial images acquisition layer to the terrestrial layer for processing and distribution of the images may be implemented by all types of known means.

According to a variant of the invention, the telecommunications layer is suitable to ensure transfers of incoming data from the terrestrial layer for processing and distribution of images to the spatial layer. These incoming data are, for example, data for controlling the spatial images acquisition layer. According to said variant, the exchanges of data between the spatial images acquisition layer and the terrestrial layer for processing and distribution of the images by means of the telecommunications layer are realised bidirectionally.

These bidirectional exchanges make it possible to ensure, without any particular complementary means, the control of the satellites and of the devices for acquisition of images pertaining to the spatial images acquisition layer. Since the terrestrial layer for processing and distribution of images is distributed over the surface of the Earth so as to form a grid for processing of images, the control of the satellites can be realised from any point of the globe in simple and economical manner.

According to an advantageous variant of the invention, the images are transmitted by said telecommunications layer from said spatial layer to the terrestrial layer for processing and distribution of the images in accordance with a protocol for multiplexing by wideband code (W-CDMA, Wideband Code Division Multiple Access).

A protocol for multiplexing by wideband code, better known under the acronym W-CDMA, is a data-transmission protocol that uses a spread spectrum in order to apportion the transmissions over numerous frequencies.

Said protocol is the basis for the UMTS (Universal Mobile Telecommunications System) standard. In particular, it makes it possible to send simultaneously all the data—by means of packets and in disorder—on any frequency of the authorised range. The receiving module receives the data and formats them. That makes it possible to attain high rates of transmission.

Thus an instrument according to the invention may advantageously be based on networks for terrestrial telecommunication that use said UMTS standard.

In the near future the telecommunications layer will also be able to include terrestrial telecommunications networks based on future technologies such as OFDM (Orthogonal Frequency-Division Multiplexing) technology or HSPA (High-Speed Downlink Package Access) technology.

Advantageously and according to the invention, in a variant, said telecommunications layer is suitable to transmit the images from said spatial layer to said terrestrial layer for processing and distribution of the images in accordance with a communications protocol using an Internet standard of the IPv type or equivalent enabling bidirectional exchanges.

Said protocol for exchange between the spatial images acquisition layer and the terrestrial layer for processing and distribution of images may, for example, use standards IPv4 or IPv3 so as to enable a simple and immediate interconnection with networks of the Internet type.

According to an advantageous variant of the invention, the control of the totality of the satellites of the spatial images acquisition layer is effected by uploading addressing to the satellites regarded as IP data nodes.

According to another advantageous variant of the invention, the management of the incoming data at the level of the satellites is ensured by a PC-compatible module under Linux or any other data-processing standard ensuring a direct compatibility with the IP protocols.

An instrument according to the invention includes, for each device for processing of images pertaining to the terrestrial layer for processing and distribution of images, a connection to a digital network so as to be able to place said stored images at the disposal of users coupled to said digital network.

Said terrestrial digital network may be of any type.

Nevertheless, advantageously and according to the invention, said digital network is a public digital network.

Such a network is advantageously IP-compatible and is, for example, the Internet network. Said enables an easy sharing of the images captured by an instrument according to the invention.

An instrument according to the invention therefore makes it possible to provide to a user an image of any point of the globe that is updated each day, the image exhibiting a resolution of the order of one meter.

An instrument according to the invention enables the development of numerous novel applications. In particular, fields as varied as agriculture, cartography, cadastral surveying, defence, the environment, urban planning, telecommunications, risk management, management of renewable resources, etc. possess with an instrument according to the invention a means to obtain recent data enabling diverse analyses. In other words, an instrument according to the invention will enable any user possessing a connection to the digital network, for example the Internet network, to see any point on the globe, the image of said point dating back at most one day and exhibiting a ground resolution of the order of one meter.

According to an advantageous variant of the invention, the instrument includes at least one terrestrial server, called the geoportal server, located somewhere on the surface of the globe and coupled to the public network. A user can log on to the geoportal server by means of the public network in order to submit a request for display of an image of a given region. The geoportal server includes a module that is suitable to determine, according to the region corresponding to the request received, the terrestrial images processing and distribution device including the corresponding image. The geoportal server then logs on to said terrestrial images processing and distribution device by means of the public network, and downloads the corresponding image in order to place it at the disposal of the user. Thus according to said embodiment the distribution of the image of the Earth over the various terrestrial devices for processing and distribution of images is completely transparent for the user. Solely the geoportal server includes a table for determination, according to the coordinates of the region corresponding to the request received, of the device(s) for processing including the image.

According to an advantageous variant of the invention, the instrument includes, in addition, a terrestrial server, called the geoportal server, coupled by said public digital network to each terrestrial images processing and distribution device, said geoportal server comprising:

means for receiving a request for provision of an image of a given region of the terrestrial globe originating from a user, means for analysis of said request and for determination of the terrestrial images processing and distribution device having said image stored in its storage means, means for downloading said image from the terrestrial images processing and distribution device that has been determined, means for placing the downloaded image at the disposal of said user.

Such a geoportal server confers on an instrument according to the invention a capacity for placing, in simple and rapid manner, the image of the globe created by the instrument at the disposal of any user connected to the public digital network.

Thus an instrument according to said variant is able to offer services unavailable hitherto, such as the provision, to any user having a Internet connection, of an image of any region of the globe dating back less than 24 hours and exhibiting a ground resolution of the order of one meter.

The invention relates, in addition, to an instrument for acquisition and distribution of terrestrial-observation satellite images, characterised in combination by all or some of the characteristics mentioned above or below.

Other characteristics, objectives and advantages of the invention will become apparent from the following description which presents, by way of non-limiting example, an embodiment of the invention with reference to the appended drawings; in these drawings.

In the Figures the scales and proportions have not been conformed to, for the purposes of illustration and clarity.

Figure 1:
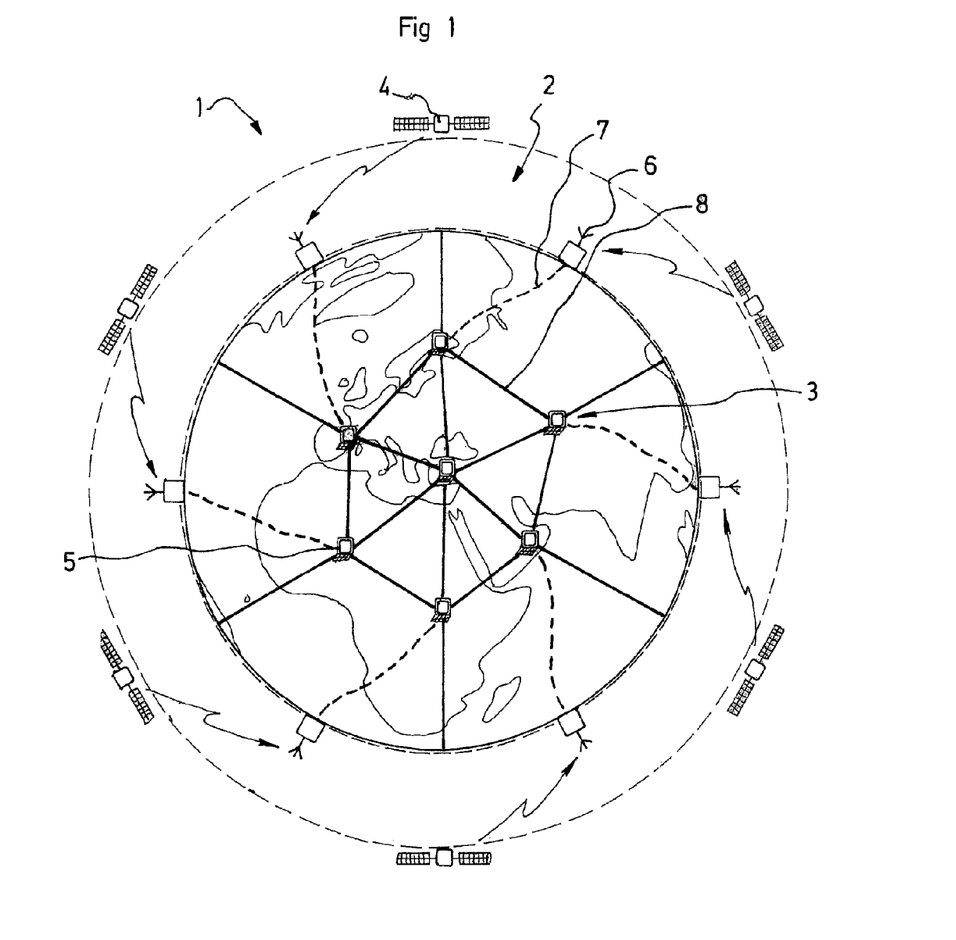
FIG. 1 is a schematic view of an instrument for acquisition and distribution of Earth-observation satellite images according to an embodiment of the invention.

As represented in FIG. 1, an instrument for acquisition and distribution of Earth-observation satellite images according to the invention comprises a constellation of satellites, called the spatial layer 1 for acquisition of images, a plurality of terrestrial devices for processing and distribution of images, called the terrestrial layer 3 for processing and distribution of images, and a data-transmission network, called the telecommunications layer 2, that is suitable to ensure a transfer of the images captured by the spatial layer 1 for acquisition of images to the terrestrial layer 3 for processing and distribution of the images.

The spatial layer 1 of an instrument according to the invention comprises a plurality of satellites 4, each satellite 4 exhibiting a swath F and a low orbit so that it can describe a number ORB of orbits in a day.

Figure 2:
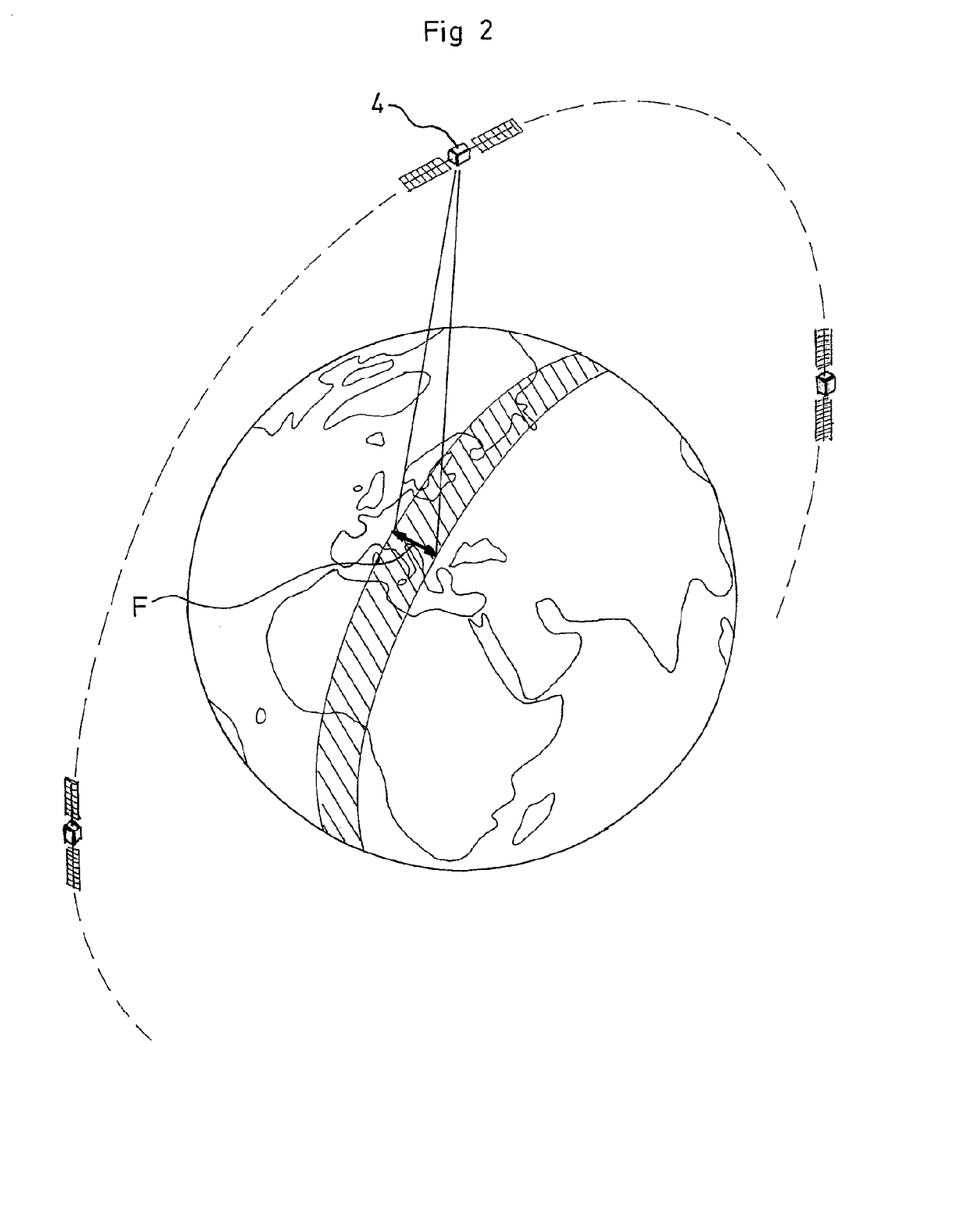
FIG. 2 is a schematic view of a satellite of a spatial images acquisition layer pertaining to an instrument according to an embodiment of the invention in low orbit around the Earth.

FIG. 2 presents such a satellite 4 in low orbit around the Earth, and the track of said satellite 4 on the Earth.

Each satellite 4 of an instrument according to the invention preferably executes more than one orbit in a day. According to one embodiment of the invention, each satellite 4 executes sixteen orbits in a day.

Each satellite 4 includes, in addition, at least one optical images acquisition device with fixed aim.

Such an optical images acquisition device is, for example, a fixed camera which is directed towards the Earth and suitable to acquire multispectral images of the terrestrial regions that the satellite 4 overflies.

Thus a satellite 4 of an instrument according to the invention does not require a particular pointing program, substantially reducing the costs of manufacture and maintenance.

According to one embodiment of the invention, such a satellite is an optical parachute.

Each satellite 4 includes, in addition, at least one module for sending images that is suitable to send, after each acquisition of images by an optical images acquisition device pertaining to said satellite 4, the acquired image to the terrestrial layer 3 for processing and distribution of the images. Such a sending module may be of any known type and is not described here in detail.

The terrestrial layer 3 for processing and distribution of the images comprises a plurality of terrestrial devices 5 for processing and distribution of images.

Each terrestrial device 5 for processing and distribution of images includes at least one module for receiving images that is suitable to receive images resulting from the spatial layer 1 for acquisition of images.

The modules for sending images pertaining to the satellites 4, and the modules for receiving images pertaining to the terrestrial devices 5 for processing and distribution of images, form a part of the telecommunications layer 2.

Said telecommunications layer 2 may include other sending/receiving devices that are suitable to ensure a transfer of the images from the spatial layer 1 for acquisition of images to the terrestrial layer 3 for processing of the images.

In practice, the sending and receiving modules are linked with sending antennas and receiving antennas 6.

According to an embodiment of the invention as represented in FIG. 1, the receiving antennas 6 are remote from the terrestrial devices 5 for processing and distribution of images. Each terrestrial device 5 for processing and distribution of images is coupled to an antenna 6 by a link 7. Said link may be of any type. For example, said link 7 may be a wired link, a radio wireless link, wifi, etc.

Figure 3:
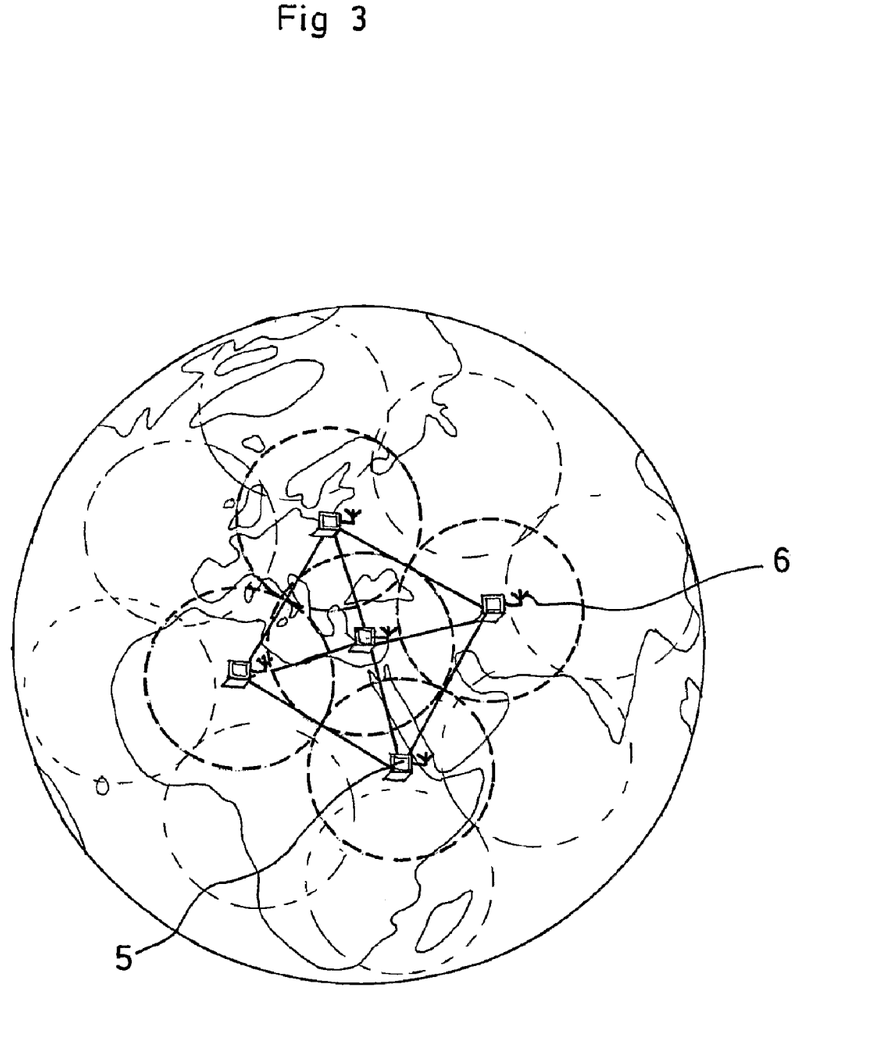
FIG. 3 is a schematic view of a terrestrial layer for processing and distribution of images and of a portion of a telecommunications layer of an instrument according to an embodiment of the invention, in which the circles of visibility of the modules for receiving the images and the links between the adjacent terrestrial devices for processing and distribution of images are represented.

According to another particularly advantageous embodiment as represented in FIG. 3, each terrestrial device 5 for processing and distribution of images includes locally an antenna 6.

Figure 4:
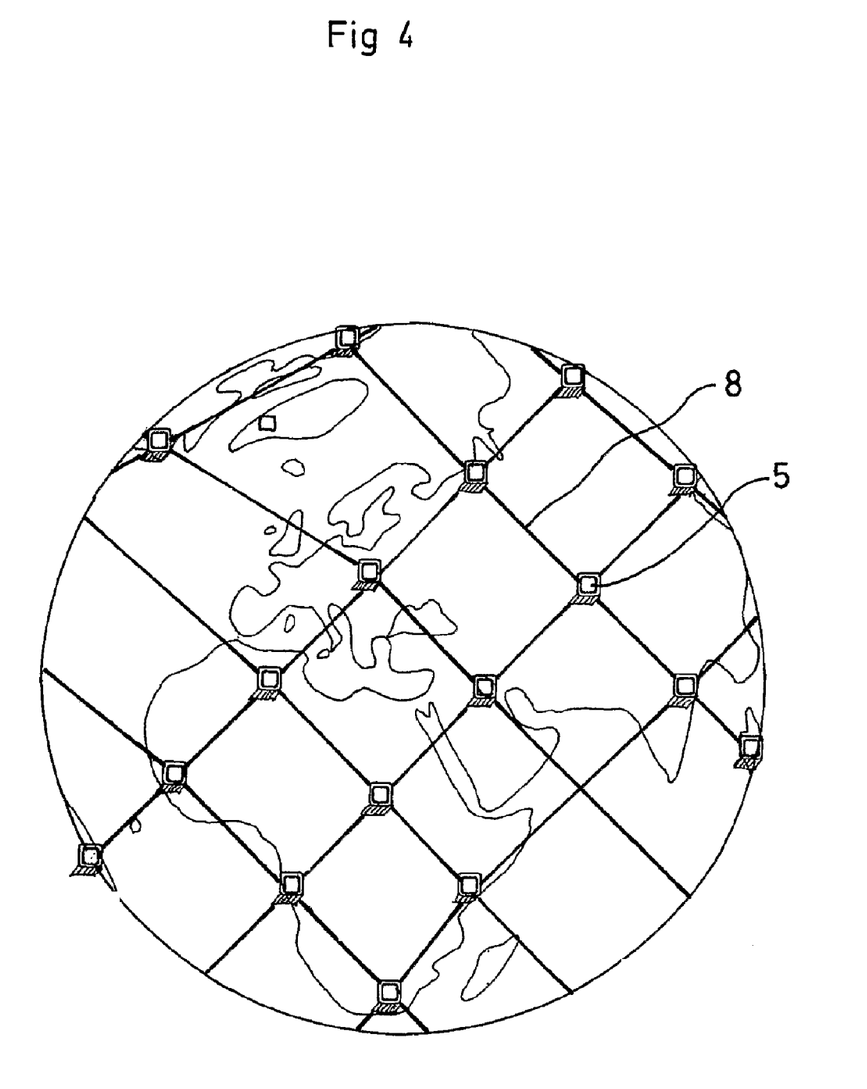
FIG. 4 is a schematic view of a processing layer of an instrument according to an embodiment of the invention, in which the links between two adjacent terrestrial devices for processing and distribution of images are represented.

According to the invention and as represented in the Figures, each terrestrial device 5 for processing and distribution of images pertaining to the terrestrial layer 3 for processing and distribution of images includes, in addition, a communications line 8 coupling said terrestrial device 5 for processing and distribution of images and at least one immediately adjacent terrestrial images processing and distribution device.

Said communications line 8 makes it possible to ensure overlaps of the images received by said terrestrial images processing and distribution device with images received by the immediately adjacent terrestrial device(s) for processing and distribution of images. The communications lines 8 may be of any type. For example, these communications lines 8 may be wired links or wireless links.

Figure 5:
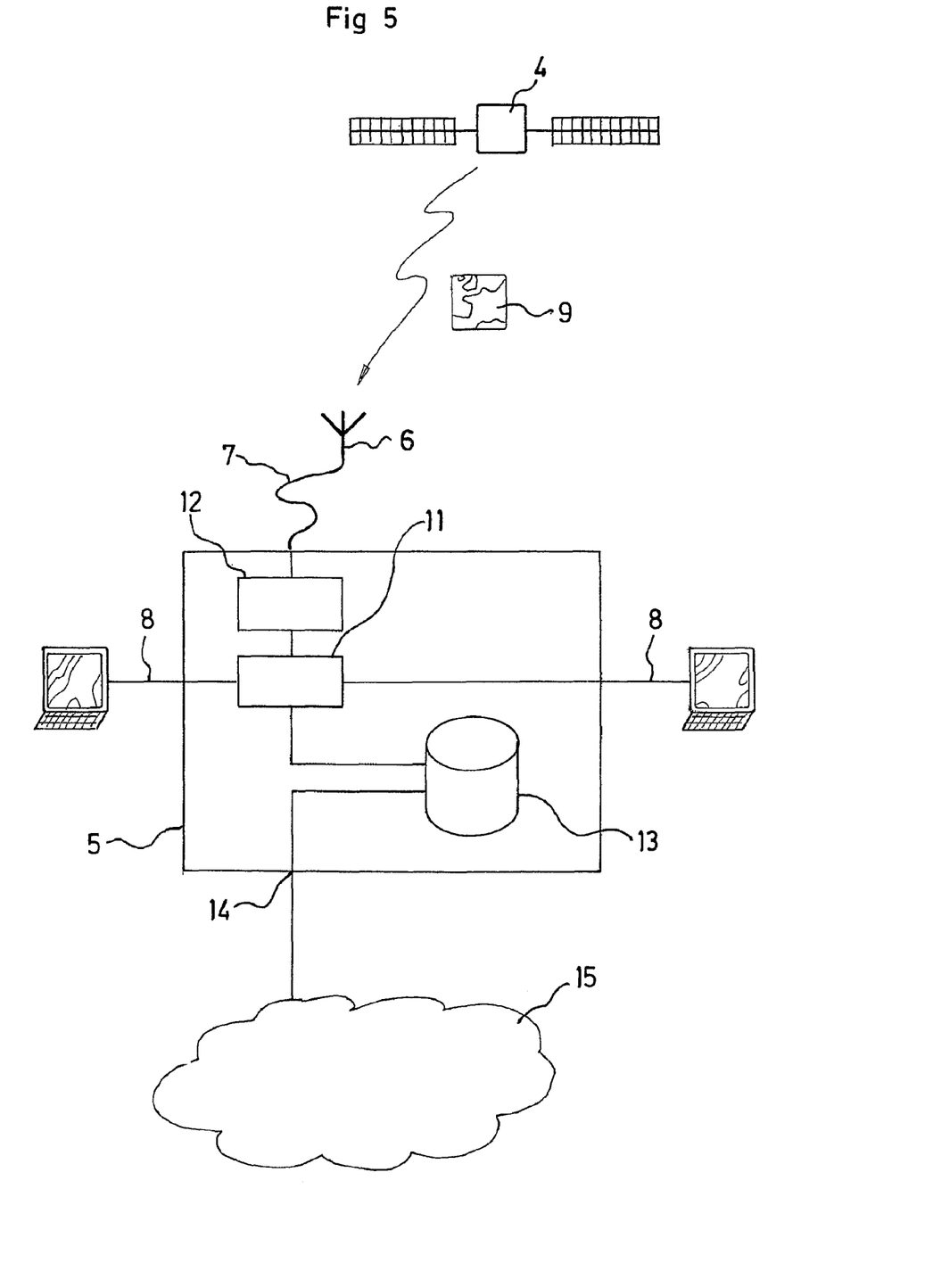
FIG. 5 is a schematic view of a terrestrial images processing and distribution device pertaining to an instrument according to an embodiment of the invention.

Each terrestrial device 5 for processing and distribution of images includes, in addition, as represented in FIG. 5, a processing unit 11 that is suitable to process the images 9 received by the receiving module 12 of said terrestrial device 5 for processing and distribution of images.

An image-processing unit 11 of a terrestrial device 5 for processing and distribution of images is, for example, a processing unit of a microcomputer including software means for processing of the images.

Each terrestrial device 5 for processing and distribution of images includes, in addition, means 13 for storage of the images processed by the processing unit 11. These storage means 13 may be of any type. For example, these storage means 13 are constituted by a mass-storage device such as a disc memory.

Each terrestrial device 5 for processing and distribution of images includes, in addition, a connection 14 to a digital network 15, so as to be able to place the images stored by the storage means 13 at the disposal of users coupled to said digital network 15.

According to a preferred embodiment of the invention, an instrument includes at least N satellites, where $$N = 2 * \frac{C}{ORB * F},$$

where C is the mean circumference of the Earth, ORB is the number of orbits executed by a satellite 4 in one day, and F is its swath.

According to a preferred embodiment of the invention, an instrument includes, in addition, M terrestrial devices 5 for processing and distribution of images, where $$M = \alpha \cdot \left(\frac{C}{\pi \cdot r}\right)^2,$$

r being the mean radius of the circles of visibility of the antennas 6 linked with the receiving modules 12 of the terrestrial devices 5 for processing and distribution of images, and a being a predetermined coefficient making it possible to ensure an overlap of the circles of visibility.

According to a preferred embodiment, the coefficient α is fixed at 1.2, which makes it possible to obtain a rate of overlap of 20%.

For example, according to one embodiment of the invention N is fixed at 25, each satellite 4 exhibiting a swath of 100 km.

According to another embodiment of the invention, N is fixed at 250, each satellite exhibiting a swath of 10 km.

According to a preferred embodiment of the invention, the number of terrestrial devices 5 for processing and distribution of images pertaining to the terrestrial layer 3 for processing and distribution of images is equal to the number of satellites 4 of the spatial layer 1 for acquisition of images.

A receiving antenna 6 linked with a receiving module 12 of a terrestrial device 5 for processing and distribution of images may be of any type. In particular, an antenna 6 may exhibit diverse circles of visibility, according, in particular, to its altitude. According to one embodiment of the invention, each antenna 6 exhibits a circle of visibility of 2500 km.

According to said embodiment, an instrument according to the invention may include 25 antennas 6 linked with 25 terrestrial devices for processing and distribution of images, distributed over the surface of the Earth.

According to a preferred embodiment of the invention, each communications line 8 between two terrestrial devices 5 for processing and distribution of images is a communications line of the digital network 15. In the case where the digital network 15 is the Internet network, the provision of an instrument according to the invention is thus particularly easy and economical.

Furthermore, in the case where the receiving antennas 6 are delocalised from the terrestrial devices 5 for processing and distribution of images, the links 7 are also advantageously links of the digital network 15.

In other words, an instrument according to said embodiment may be regarded as a digital network 15 including a plurality of servers which are constituted, on the one hand, by terrestrial devices 5 for processing and distribution of images and, on the other hand, by satellites 4 in orbit for acquisition of images.

The communications between the spatial layer 1 for acquisition of images and the terrestrial layer 3 for processing and distribution of images, and the communications between the terrestrial devices 5 for processing and distribution of images, may be of any type.

Nevertheless, according to a preferred embodiment of the invention the communications use a UMTS protocol.

According to other embodiments, the communications may use other protocols, such as, for example, the protocols based on future technologies such as OFDM (Orthogonal Frequency-Division Multiplexing) technology or HSPA (High-Speed Downlink Package Access) technology.

According to a preferred embodiment of the invention, the images are compressed before being sent to the terrestrial layer 3 for processing and distribution of images. Said compression may be of any type, such as, for example, a JPEG compression.

An instrument according to the invention makes it possible to implement daily metrical shots of the whole of the Earth in simple and economical manner.

These shots may advantageously be distributed by means of a central server to which registered users log on.

In order to do said, an instrument according to the invention advantageously includes a server, called the geoportal server, coupled by the public digital network 15 to each processing device 5.

Said server comprises means for receiving a request for provision of an image of a given region of the globe originating from a remote user, means for analysis of said request and for determination of the terrestrial device 5 for processing and distribution of images including the corresponding image 9, and means for downloading the image 9 in order to place it at the disposal of said user.

The image of the Earth obtained by an instrument according to the invention is distributed over the surface of the Earth. On the other hand, said distribution is transparent for a user, in view of the fact that it is the geoportal server which is responsible, according to the received request, for logging on to the corresponding terrestrial devices 5 for processing and distribution of images, and for downloading the images in order to place them at the disposal of the user. Such a geoportal server is, for example, a microcomputer including calculating means, storage means, software for analysis of the requests and for processing of the requests, etc.

An instrument according to the invention makes it possible to acquire and to provide terrestrial-observation satellite images that exhibit high spatial and temporal resolutions, in particular of the order of one meter and one day, respectively.

An instrument according to the invention physically distributes the totality of the acquired images over the Earth, enabling downloading and processing of the data. In particular, the pass-bands utilised are compatible with technologies available today.

An instrument according to the invention does not require any depointing of the devices for acquisition of images on board the satellites.

Furthermore, an instrument according to the invention does not require any central server for recording and/or distribution of the images, and is free from such a central server. The images are constantly distributed over the Earth and stored in the storage means of the various terrestrial devices for processing and distribution of the images.

An instrument according to the invention is particularly suitable to provide images of the Earth to users connected to a public digital network of the Internet type. In particular, an instrument according to the invention enables any user connected to said network to retrieve an image of a portion of the Earth exhibiting a resolution of the order of one meter and dating back less than one day. Consequently, an instrument according to the invention opens the way towards numerous novel applications, in particular in the fields of agriculture, cartography, security, defence, the environment, urban planning, telecommunications, risk management, management of renewable resources, etc.

An instrument according to the invention may be the subject of numerous variants not specifically described. In particular, an instrument according to the invention may include other devices for acquisition of images arranged on board other flying craft, or even arranged on tall terrestrial structures, such as apartment buildings, and may transmit the acquired images to the layer for processing of the images by means of the telecommunications layer. Said telecommunications layer may also include various additional devices making it possible to convey the images from the layer for acquisition of images to the terrestrial layer for processing and distribution of images. These additional devices are, for example, relay antennas, intermediate networks, etc. The terrestrial layer for processing and distribution of images may comprise a great variety of terrestrial devices for processing and distribution of images distributed over the surface of the Earth. These devices may be microcomputers connected to a public network such as the Internet, and generally may be any device that is suitable to receive an image, to process the image, and to place it at the disposal of users of the network.

The invention claimed is:

1. Instrument for acquisition and distribution of observation images of the Earth of mean circumference C comprising:

a constellation of satellites, called a spatial images acquisition layer, each satellite exhibiting a swath F and a low orbit so that it can describe a number ORB (ORB>1) of orbits in one day, and being equipped with at least one optical images acquisition device, a plurality of terrestrial devices for processing and distribution images, called terrestrial images processing and distribution devices, said plurality being called a terrestrial images processing and distribution layer, a data-transmission network, called a telecommunications layer, that is suitable to ensure a transfer of the images captured by said spatial images acquisition layer to said terrestrial images processing and distribution layer, said telecommunications layer comprising:

for each satellite, at least one sending module that is suitable to send, after each acquisition of images by said at least one optical images acquisition device of pertaining to said satellite, the acquired image to said terrestrial images processing and distribution layer, for each terrestrial images processing and distribution device, at least one receiving module that is suitable to receive images resulting from said spatial images acquisition layer, and corresponding to a zone of visibility of said at least one receiving module the images received by said terrestrial images processing and distribution device covering a predetermined terrestrial region, wherein:

said spatial images acquisition layer comprises, for each satellite, at least one optical images acquisition device having a fixed aiming directed towards the Earth and exhibiting a high spatial resolution, said terrestrial images processing and distribution layer includes, for each terrestrial images processing and distribution device, at least one communications line coupling said terrestrial images processing and distribution device and at least one immediately adjacent terrestrial images processing and distribution device so as to enable overlaps of the images received by said terrestrial images processing and distribution device with images received by said at least one immediately adjacent terrestrial images processing and distribution device(s), said images received by said immediately adjacent terrestrial images processing and distribution devices being representative of neighbouring terrestrial regions, each terrestrial images processing and distribution device comprises:

a processing unit that is suitable to process the images received by said receiving module of said terrestrial images processing and distribution device, memory means receiving and storing said images processed by said processing unit, and a connection to a digital network allowing to place said stored images directly at the disposal of users coupled to said terrestrial images processing and distribution device via said digital network, wherein, said spatial images acquisition layer comprises at least N satellites, where $$N = 2 * \frac{C}{ORB * F},$$

said terrestrial images processing and distribution layer comprises at least M terrestrial images processing and distribution devices distributed over the surface of the Earth, where $$M = \alpha \cdot \left(\frac{C}{\pi \cdot r}\right)^2,$$

r being the mean radius of the circles of visibility of antennas linked with the receiving modules of the terrestrial images processing and distribution devices, and a being a predetermined coefficient.

2. Instrument as claimed in claim 1, wherein said satellites of said spatial images acquisition layer, said terrestrial images processing and distribution devices for pertaining to said terrestrial images processing and distribution layer, said modules for sending images pertaining to said telecommunications layer, and said modules for receiving images pertaining to said telecommunications layer are geographically distributed over the whole of the Earth.

3. Instrument as claimed in claim 1, wherein said spatial images acquisition layer comprises at least 25 satellites, each satellite exhibiting a swath of the order of 100 kilometers.

4. Instrument as claimed in claim 1, wherein said spatial images acquisition layer comprises at least 250 satellites, each satellite exhibiting a swath of the order of 10 kilometers.

5. Instrument as claimed in claim 1, wherein each satellite exhibits a heliosynchronous quasi-polar orbit.

6. Instrument as claimed in claim 1, wherein said telecommunications layer transmits said images from said spatial layer to said terrestrial images processing and distribution layer in accordance with a UMTS protocol.

7. Instrument as claimed in claim 1, wherein said telecommunications layer transmits the images from said spatial layer to said terrestrial images processing and distribution layer in accordance with a communications protocol using an Internet standard of the IPv type or equivalent enabling bidirectional exchanges.

8. Instrument as claimed in claim 1, wherein each satellite of said spatial images acquisition layer includes at least one optical images acquisition instrument for with fixed aim exhibiting a spatial resolution of the order of one meter.

9. Instrument as claimed in claim 8, wherein:
each sending module of said telecommunications layer is suitable to communicate with at least one adjacent sending module,
each receiving module of said telecommunications layer is suitable to communicate with at least one adjacent receiving module.

10. Instrument as claimed in claim 8, wherein said satellites of said spatial images acquisition layer, said terrestrial images processing and distribution devices for pertaining to said terrestrial images processing and distribution layer, said modules for sending images pertaining to said telecommunications layer, and said modules for receiving images pertaining to said telecommunications layer are geographically distributed over the whole of the Earth.

11. Instrument as claimed in claim 1, wherein:
each sending module of said telecommunications layer is suitable to communicate with at least one adjacent sending module,
each receiving module of said telecommunications layer is suitable to communicate with at least one adjacent receiving module.

12. Instrument as claimed in claim 11, wherein said satellites of said spatial images acquisition layer, said terrestrial images processing and distribution devices for pertaining to said terrestrial images processing and distribution layer, said modules for sending images pertaining to said telecommunications layer, and said modules for receiving images pertaining to said telecommunications layer are geographically distributed over the whole of the Earth.

13. Instrument as claimed in claim 1, wherein for each satellite said module for sending the images pertaining to said telecommunications layer is suitable to ensure a compression of the images.

14. Instrument as claimed in claim 13, wherein for each satellite said compression effected by said module for sending the images is a JPEG compression.

15. Instrument as claimed in claim 1, wherein said digital network to which said terrestrial images processing and distribution devices pertaining to said terrestrial images processing and distribution layer can be connected is a public digital network.

16. Instrument as claimed in claim 15, further comprising:
a terrestrial geoportal server, coupled by said public digital network to each terrestrial images processing and distribution device, said terrestrial geoportal server
receiving a request for provision of an image of a given region of the globe originating from a remote user,
analyzing of said request and for determination of the terrestrial images processing and distribution device having said image stored in its storage means,
downloading said image from the determined terrestrial images processing and distribution device, and
placing the downloaded image at the disposal of said user.

17. Instrument for acquisition and distribution of observation images of the Earth of mean circumference C comprising:
a constellation of satellites, called the spatial images acquisition layer, each satellite exhibiting a swath F and a low orbit so that it can describe a number ORB (ORB>1) of orbits in one day, and being equipped with at least one optical images acquisition device,
a plurality of terrestrial images processing and distribution devices, called the terrestrial images processing and distribution layer,
a data-transmission network, called the telecommunications layer, that is suitable to ensure a transfer of the images captured by said spatial images acquisition layer to said terrestrial images processing and distribution layer, said telecommunications layer comprising:
for each satellite, at least one sending module that is suitable to send, after each acquisition of images by said at least one optical images acquisition device of pertaining to said satellite, the acquired image to said terrestrial images processing and distribution layer,
for each terrestrial images processing and distribution device, at least one receiving module that is suitable to receive images resulting from said spatial images acquisition layer, wherein:
said spatial images acquisition layer comprises, for each satellite, at least one optical images acquisition device having a fixed aiming and exhibiting a high spatial resolution, said terrestrial images processing and distribution layer includes, for each terrestrial images processing and distribution device, at least one communications line coupling said terrestrial images processing and distribution device and at least one immediately adjacent terrestrial images processing and distribution device so as to enable overlaps of the images received by said terrestrial images processing and distribution device with images received by said at least one immediately adjacent terrestrial images processing and distribution device(s), each terrestrial images processing and distribution device comprises:
  a processing unit that is suitable to process the images received by said receiving module of said terrestrial images processing and distribution device,
  memory means receiving and storing said images processed by said processing unit
  a connection to a digital network allowing to place said stored images at the disposal of users coupled to said digital network, said spatial images acquisition layer comprises at least N satellites, where $$N = 2 * \frac{C}{ORB * F},$$

said terrestrial images processing and distribution layer comprises at least M terrestrial images processing and distribution devices distributed over the surface of the Earth, where $$M = \alpha \cdot \left(\frac{C}{\pi \cdot r}\right)^2,$$

r being the mean radius of the circles of visibility of antennas linked with the receiving modules of the terrestrial images processing and distribution devices, and a being a predetermined coefficient.

* * * * *

UNITED STATES PATENT AND TRADEMARK OFFICE
CERTIFICATE OF CORRECTION

PATENT NO.      : 8,384,778 B2                                               Page 1 of 1
APPLICATION NO. : 12/675859
DATED           : February 26, 2013
INVENTOR(S)     : Jean-Pierre Antikidis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
First Day of September, 2015

Michelle K. Lee
*Director of the United States Patent and Trademark Office*